Nov. 19, 1957 R. W. TRIPP ET AL 2,813,458
MAGNIFIER
Filed Sept. 18, 1952 2 Sheets-Sheet 2
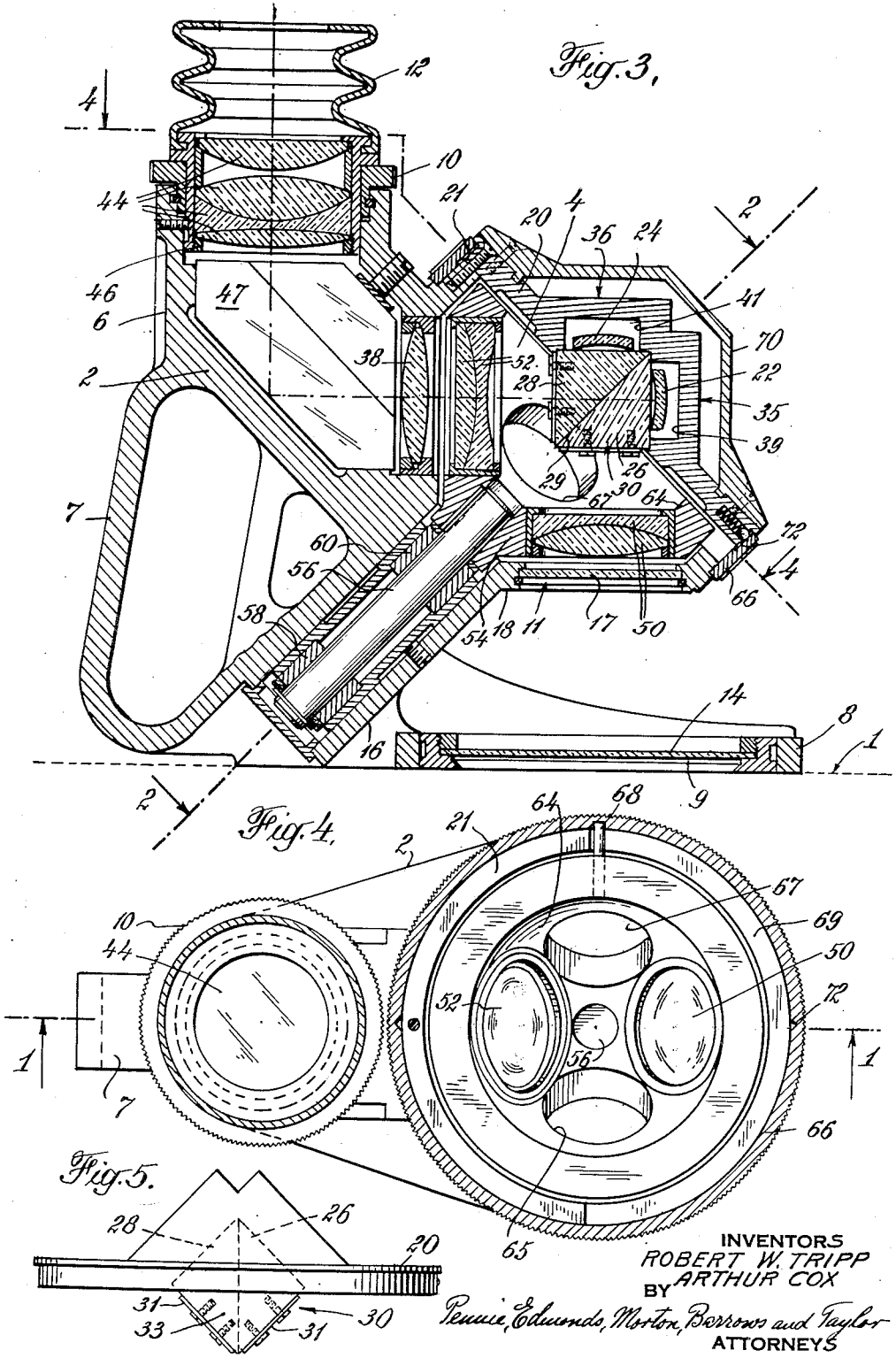
INVENTORS
ROBERT W. TRIPP
ARTHUR COX
BY
Pennie, Edmonds, Morton, Barrows and Taylor
ATTORNEYS United States Patent Office 2,813,458
Patented Nov. 19, 1957

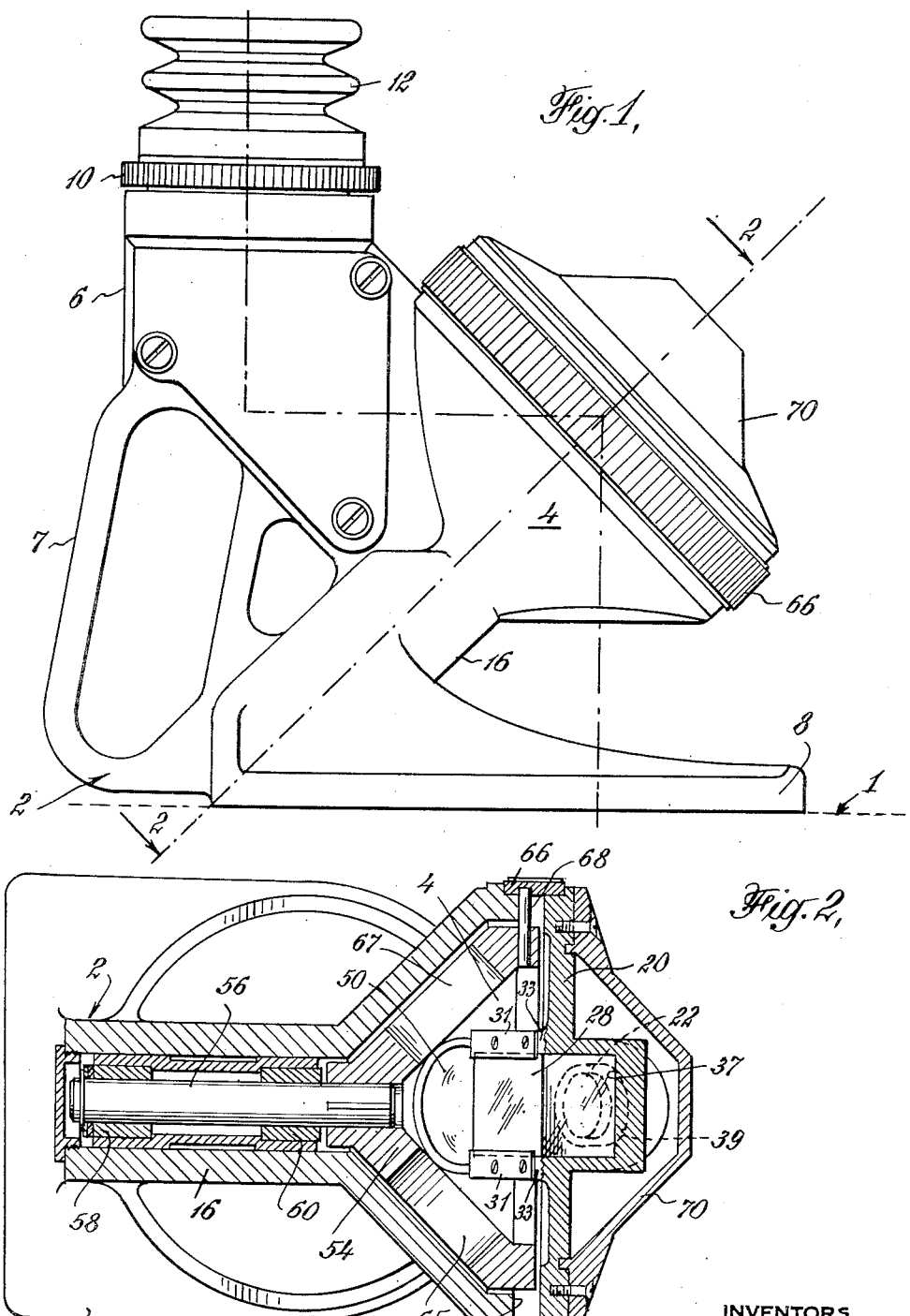

2,813,458

MAGNIFIER

Robert W. Tripp, Bronxville, and Arthur Cox, Tuckahoe, N. Y., assignors to Farrand Optical Co., Inc., New York, N. Y., a corporation of New York Application September 18, 1952, Serial No. 310,168

3 Claims. (Cl. 88—39)

This invention relates to magnifiers and more particularly to magnifiers having a relatively flat field. The invention provides a magnifier employing a concave mirror as imaging element, together with a partially reflecting plane mirror surface so positioned that the concave mirror faces it obliquely. This surface serves to throw the image of the object formed by the concave mirror outside the optical axis between the object and that surface, to a position where that image can be conveniently employed as by recording it on a photographic plate or by examining it with an eyepiece. In a preferred embodiment, two identical concave mirrors are provided, supported with respect to the reflecting surface at positions which are mirror images of each other therein, and the two concave mirrors produce images whose sum is brighter than the image produced by either one alone.

In a further preferred embodiment the magnifier of the invention includes an eyepiece, and the instrument so formed is characterized by low distortion, low astigmatism and by a large, flat field. In embodiments including an eyepiece the partially reflecting plane mirror is positioned (optically) between the concave mirror objective and the eyepiece. Physically, the concave mirror and eyepiece may lie on the same or on opposite sides of the partially reflecting plane mirror, unless concave mirrors are provided on both sides thereof.

The eyepiece and objective are preferably supported in fixed positions relative to each other, the position of the objects to be examined is defined by object-plane defining means such as the base of the instrument, and this object plane is made substantially conjugate in the objective to the first focal plane of the eyepiece.

By employing a concave mirror or mirrors as objective, a negative contribution is made to the Petzval sum of the system. This negative contribution may be made to compensate partly or wholly for the positive contribution of the eyepiece, so that the Petzval sum of the system may be reduced and if desired brought to zero. A necessary condition to the elimination of astigmatism and field curvature together is thereby fulfilled, and, in accordance with the invention, there is preferably employed with the concave mirror objective an eyepiece of generally Huygenian type characterized by low distortion, despite the high positive Petzval sum of such eyepieces.

In a preferred embodiment of the invention the objective is (or the objectives are) mounted in a structure which defines the object plane at an optical distance from the concave mirror objective or objectives substantially equal to their radius of curvature, so that the objectives operate at unity magnification, the magnification of the instrument in excess of unity being produced in the first instance by the eyepiece.

Since the objective is (or the objectives are) used at substantially unity magnification, two powers can be obtained for the system without changing the position of the object and image planes of the objective by means of power change lenses inserted in a reciprocable manner between the object plane and objective (or objectives) and between the objective (or objectives) and its (or their) image plane. Interchange of the power change lenses reciprocally changes the power of the combination of objective mirror or mirrors and power change lenses, and a third power may be obtained by removing both of the power change lenses from the optical path of the instrument.

Complete erection of the image observed with the eyepiece is effected in a preferred embodiment by the incorporation of a roof prism in the eyepiece. The roof prism adds a reversion to the inversion effected at the plane partially reflecting mirror in the passage of the light from the object plane to the objective or from the objective to the first image.

The invention will now be described in terms of a preferred embodiment illustrated in the accompanying drawings in which:

Fig. 1 is a view in side elevation of a magnifier according to the invention;

Fig. 2 is a sectional view taken on the line 2—2 of Fig. 1;

Fig. 3 is a sectional view in elevation of the instrument of Fig. 1;

Fig. 4 is a sectional view taken on the line 4—4 of Fig. 3; and

Fig. 5 is an elevational view of the support for the objectives and partially reflecting plane mirror associated therewith.

In the magnifier shown in the drawings, a frame generally indicated at 2 includes an objective housing portion 4, an eyepiece housing portion 6, a base 8 whose lower surface defines an object plane 1 for the instrument, and a handle or grip 7. A reticle 9 may be provided in the base in close proximity to the object plane, as indicated in Fig. 3. An adjusting ring 10 is coupled to the elements 44 of the eyepiece to permit focusing of the eyepiece to suit the visual habits of the user and, if necessary, to correct for minor changes in the position of the image produced by the objective and the power change lenses which may occur upon power change. The eyepiece is surmounted by an eye guard 12.

The optical system is illustrated in Fig. 3. Adjacent the object plane is positioned a window 14 having a reticle 9 graved on its lower surface. The frame 2, which may be formed as a casting, extends up from the base in a stem-like portion 16 inclined preferably at 45° to the object plane, and flares into a roughly conical portion 18 from which the objective mirrors 22 and 24 and partially reflecting or beam splitting mirror presently to be described are supported via a plate-shaped member 20. The member 20 rests on the semi-circular plane surface 21 of the frame portion 18 shown in Fig. 4, and is suitably fastened thereto. An opening at 11 in the objective housing portion 4 permits passage of light from the object plane to the objectives. This opening may be protected by means of a transparent window 17.

In the preferred embodiment illustrated in the drawings the objectives 22 and 24 are two identical Mangin mirrors supported with their axes at right angles to and intersecting each other. Each comprises a negative meniscus lens the convex surface of which is silvered or otherwise coated to make it reflecting as a concave spherical mirror. In the present invention Mangin mirrors are preferred over simple spherical mirrors because of the greater negative contribution which they make to the Petzval sum of the system. Mangin mirrors are described for example at pages 142 and 143 of Jacobs' Fundamentals of Optical Engineering, 1st ed., 1943.

A partially reflecting plane surface indicated at 29 is provided between the mirrors 22 and 24, with its plane bisecting the angle between their two axes and perpendicular to the plane defined by those two axes. In the embodiment illustrated the partially reflecting plane mirror surface is formed at the interface between two right triangular prisms 26 and 28 which form together a beam splitting cube generally indicated at 30. The reflectivity of the interface is made as nearly 50 percent as convenient, by applying to the hypotenuse face of one or both prisms a suitable metallic or dielectric coating. The two prisms are then cemented together at their hypotenuse faces to form a rectangular parallelepiped which is typically a cube.

Prisms 26 and 28 are supported from the plate 20 by means of retainers 31 which overlap the edges of the perpendicular faces of the prisms and which are fastened to projections 33 to the plate 20. The plate is recessed as indicated in Figs. 2 and 5 to receive the prisms at their other perpendicular faces against the inner surface of a pocket indicated at 37. The pocket is further milled out at 39 and 41 to provide clearance to the objective mirrors 22 and 24.

The mirrors 22 and 24 are symmetrically located with respect to the interface 29 of the beam splitting cube, i. e. each is located at the mirror image of the other in that interface. The optical distance of each from the object plane 1 is moreover substantially equal to its effective radius of curvature. In the embodiment illustrated the mirrors 22 and 24 are cemented, at their peripheries only, to the prisms 26 and 28.

With the construction so far described, of the light from the object plane which passes into the cube some 50 percent is reflected at the surface 29 toward the mirror 22 and some 50 percent passes undeviated toward the mirror 24. Mirrors 22 and 24 are totally reflecting mirrors so that except for minor losses the light from the object plane reaching each of the objectives is returned thereby. Of the light returned by the objective 22 some 50 percent passes undeviated through the half-reflecting surface 29 and continues toward the eyepiece, the first or field element 38 of which is supported in the frame in a position geometrically coaxial with the mirror 22.

Of the light returned by the mirror 24, approximately 50 percent is reflected at the half-reflecting surface 29 and proceeds thence likewise towards the eyepiece. Thus with two Mangin mirrors 22 and 24 the image presented to the eyepiece contains approximately 50 percent of the light initially available, each mirror contributing 25 percent.

In an extension 6 of the frame there is supported an eyepiece comprising a field lens 38 and an eye lens 44, the eye lens being made up of a number of components. Together lenses 38 and 44 make up an eyepiece of the Huygenian type. The image plane which is conjugate to the object plane in the objectives 22 and 24 lies to the left of lens 38 in Fig. 3 at or near the first focal plane of the eyepiece. The field and eye lenses of the eyepiece are positioned with their axes perpendicular to each other and a roof prism 47 is supported between them. Together with an inversion top for bottom provided at the interface 29 (prior to image formation as to objective 22 and after as to objective 24), a reversion right for left at the roof of the prism 47 effects complete erection of the coincident images formed by the mirrors 22 and 24.

The eye lens 44 is mounted in a barrel 46 threaded into a ring 10 to permit adjustment of the position of the eye lens.

In the embodiment of the invention illustrated in the drawings, power change is provided by means of lenses 50 and 52 which are removably insertable in either order into the optical path of the system, one between the object plane 1 and the objective mirrors 22 and 24 and the other between the objective mirrors 22 and 24 and the eyepiece. The instrument may also be used without the power change lenses at the power given to it by the eyepiece and the objectives. A turret 54 is provided with a shaft 56 resting in bearings 58 and 60 in the stem portion 16 of the frame. The turret thus rotates about an axis lying in the plane of the partially reflecting interface 29 and also preferably in the plane of the geometrical axes 35 and 36 of the Mangin mirrors. The power change lenses 50 and 52 are supported in a generally conical portion 64 of the turret, and the conical portion is apertured at 65 and 67 (Fig. 4). In this way when the turret is rotated 90° from the position illustrated in Fig. 4 the light passes from the object plane to the mirrors 22 and 24 and thence to the eyepiece uninfluenced by the power change lenses. By rotating the turret 90° more, the order in which the power change lenses are inserted in the optical path of the instrument is reversed from that of Fig. 4. The turret is held in each of its three positions by conventional means such as a detent 72 coupling it to the frame.

For rotation of the turret to its three successive positions 90° apart, a ring 66 fits outside the frame in a race provided therefor between the conical portion 18 of the frame and the plate 20 and connects with the turret by means of a pin 68 which extends through a semicircular slot indicated at 69 in Fig. 4. A protective cover 70 fits over the objectives and the beam splitting cube.

In an embodiment of the instrument which has been successfully constructed, the objectives are operated at substantially unity magnification, and the eyepiece provides a power of 6.5. This is accordingly the power of the instrument when the power change lenses are rotated out of the optical path.

Of the power change lenses, that designated at 50 in Fig. 3 is positive in power and that designated at 52 is negative. Both are shown as doublets, although other constructions may be adopted.

Insertion of the positive lens 50 in front of the objectives, i. e. between the object plane 1 and the objectives, and of the negative lens 52 behind the objectives produces a system 50, 22, 24 and 52 of positive power in excess of unity. The lenses 50 and 52 are so designed that when inserted by the turret in the positions shown in Fig. 3 (as contrasted with the turret position 90° therefrom in which lenses 50 and 52 are inoperative) the plane conjugate to plane 1 in the system 50, 22, 24 and 52 is the same as the plane conjugate to plane 1 in mirrors 22 and 24 only. Accordingly the system 22, 24 and the system 50, 22, 24 and 52 are parfocal as to the object plane 1 defined by the base of the instrument, and substantially no adjustment, or no large adjustment need be made to the eyepiece upon such insertion of the power change lenses. In the embodiment of the invention constructed previously referred to, in which the eyepiece has a power of 6.5, the lenses 50 and 52 when inserted as shown in Fig. 3 give to the resulting objective system 50, 22, 24 and 52 a power of 1.6. The instrument therefore has a maximum power of 10.

Qualitatively, and not by way of limitation on the scope of the invention, the operation of lenses 50 and 52 may be understood in terms of the following analogy: The positive power of lens 50 tends to collimate the light from the object plane 1 which would otherwise fall divergently on the objectives 22 and 24, shortening the distance beyond the focus of those objectives at which the light would, but for the lens 52, be brought to a focus by the objectives 22 and 24. The negative power of the lens 52 however throws the resulting focus out from the objectives 22 and 24 back to the original image plane established by the objectives 22 and 24 when operating alone. Thus the combination of the objectives 22 and 24 with the lens 52 operates somewhat after the fashion of a telephoto combination, giving increased magnification over that available with the objectives 22 and 24 alone.

In a preferred embodiment of the invention three separate powers are provided for multiplication into the power of the eyepiece. Of these powers one is unity power of the objectives 22 and 24, and the other two are reciprocal powers derived from insertion of the power change lenses in opposite orders. All three of these powers are parfocal as to the object plane 1. This is achieved by providing means which establish as the object plane of the instrument for all positions of the power change lenses a plane fixed with respect to the objectives 22 and 24 and at which plane the fixed objectives 22 and 24 operate at unity magnification when employed alone, and by the further provision of means whereby the distances of the respective power change lenses from the center of the fixed objective system are the same for both positions of the power change lenses in which they are operative. This construction provides two powers which are parfocal and which are reciprocal, for the following reasons.

Because the objectives 22 and 24 alone are employed at unity magnification, their object and image distances are equal. This is true moreover whether one or both of the objectives 22 and 24 are provided. The system of mirrors 22 and 24 with the unity magnification object plane 1 is therefore entirely symmetrical. The turret 54 is moreover so constructed that in either the position of Fig. 3 or the position 180° therefrom the lens 50 is at the same distance from the center of the system of mirrors 22 and 24. Likewise in either of these turret positions the lens 52 is at the same distance from the center of the system of mirrors 22 and 24. The center of the system of mirrors 22 and 24 is at the surface of each of those mirrors. An identically located center exists at the surface of one of those mirrors if only one is employed in the instrument. It is not meant to imply however that the optical distance from the lens 50 to the surface of either of the objectives 22 and 24 is necessarily the same as the optical distance from the lens 52 to the surfaces of those mirrors.

This identical positioning of the power change lenses with respect to the center of the unity magnification system comprising the object plane 1 and the objectives 22 and 24 is achieved in the embodiment of the invention shown in the drawings by mounting the turret 54 so that its axis of rotation lies in the plane of the half reflecting plane surface 29 and in the plane defined by the optical axes of the mirrors 22 and 24. If only one objective mirror is provided, the same plane is defined by the continuations of the axis of the single objective mirror as reflected in the surface 29. By virtue of this construction the reversal of the turret is equivalent to interchange in the positions of the image and object (for the system comprising the objective mirrors and power change lenses) without changing the relative positions of the image-forming elements in that system at all. Reversal of the power change lenses not only leaves their respective distances from the surfaces of the objective mirrors unchanged; it also leaves their respective distances from the image and object planes unchanged by virtue of the fact that the object plane 1 is selected as the object plane of unity magnification for the objectives 22 and 24. Accordingly, reversal of the turret produces a reciprocal change in magnification, just as in the case of a fixed optical system the magnifications thereof as viewed from the two planes of any pair of conjugate planes are reciprocals of each other.

The invention has been described hereinabove in terms of a preferred embodiment. Numerous simplifications, modifications and departures may be made therefrom however without departing from the scope of the invention as defined in the appended claims.

Thus in its broad aspects, the invention does not require inclusion of power change means of any sort, nor the use of Mangin mirrors as opposed to simpler types of concave mirrors such as spherical mirrors, nor the use of two as opposed to one concave mirror, nor the use of a roof prism or other means to complete erection of the final image.

The combination of a concave mirror and a partially reflecting plane mirror, according to the invention, forms an optical relay useable at finite conjugates. For example, such a system can, because of the negative Petzval sum of the concave mirror, be used advantageously to form a substantially flat plane image for photographic purposes of the backwardly curved face of a cathode ray tube.

The combination of a concave mirror, partially reflecting plane mirror and an eyepiece provides a magnifier according to the invention which may readily be designed to have a low Petzval sum even with a high positive Petzval contribution from the eyepiece.

Neither is it necessary that the partially reflecting plane mirror surface be oriented at 45° to the axis or axes of the objective or objectives as in the case of the embodiment shown in the drawings, although this is a convenient and desirable form of construction.

For an operative embodiment it is only necessary that the axis of the concave objective mirror be obliquely inclined to the partially reflecting plane mirror surface and hence to the normal thereto, and that the partially reflecting plane mirror surface possesses sufficient reflectivity to reflect some light incident thereon at the angle between the axis of the concave mirror and the normal to the plane mirror, and that an eyepiece be provided whose elements are optically coaxial with the objective mirror either directly or by virtue of reflection of the optical axis of the objective in the partially reflecting plane mirror surface. Whatever the angle of inclination of the axis of the objective to the normal to the partially reflecting plane mirror, on the image side of that plane mirror, i. e. after light from the object has undergone image formation at the concave mirror and has been returned to the plane mirror for reflection thereat or passage therethrough toward the eyepiece, the optical axis of the system will be inclined to the normal to the plane mirror surface by the same angle as is the optical axis between the object plane and the plane mirror surface. Otherwise stated, the partially reflecting plane mirror surface always bisects the angle between the optical axis of the system on its initial approach to the partially reflecting plane mirror and on its final departure therefrom.

Other means than the prisms shown in the drawings may be employed to define the partially reflecting plane mirror surface required by the invention. For example a thin pellicle, suitably stretched or mounted to lie in a plane and made partially reflecting may be used. In such case the concave mirror or mirrors will be otherwise supported in fixed position relative to the elements of the eyepiece than as shown in the embodiment of the drawings. Even with the prisms, other methods of support for the mirrors may be employed; indeed the concave mirrors may be ground directly on perpendicular faces of the prisms.

In the case of simple concave mirrors such as front surface spherical mirrors for example, which may be used in the instrument of the invention in place of the Mangin mirrors shown in the drawings, there is no unique axis therefor, and the optical axis of the instrument is preferably defined beginning with the optical axis of the eyepiece. The eyepiece will have a unique optical axis, and this axis in the object space of the eyepiece, as reflected by and as transmitted through the partially reflecting plane surface and as reflected by the concave mirror or mirrors, defines an optical axis for the instrument as a whole extending all the way from the position of the observer's eye in the image space of the eyepiece to the object plane of the instrument.

If description of the relative positions of the optical elements of the instrument is undertaken from the optical axis of the eyepiece as point of departure, it may be said that the partially reflecting plane mirror surface must be obliquely inclined to the optical axis of the eyepiece in itse object space and that the objective mirror or mirrors must be positioned to be intersected by that optical axis as transmitted through or reflected by the partially reflecting plane mirror surface. Of course it is not intended hereby to exclude from the scope of the invention special cases in which the concave mirrors might for some reason be apertured in the vicinity of their intersections with the optical axis of the instrument as presently defined.

We claim:

1. A magnifier comprising an eyepiece, a semi-transparent plane mirror disposed on the object side of the eyepiece in position to be obliquely intersected by the optical axis of the eyepiece in its object space, a concave mirror disposed on the same side of said plane mirror as said eyepiece in position to be intersected by said axis as reflected by said plane mirror, said concave mirror having its concave side facing said plane mirror, means defining an object plane transverse to said axis as reflected in said plane and concave mirrors, said object plane being optically distant from said concave mirror by a distance whose conjugate in said concave mirror is substantially equal to the optical distance between said concave mirror and the first focal plane of said eyepiece, the optical distance between said concave mirror and said first focal plane being substantially equal to the radius of curvature of said concave mirror, lens supporting means journaled for rotation in an axis fixed with respect to said eyepiece and concave mirror, said axis of rotation lying in the plane of said plane mirror and in the plane defined by said optical axis before and after reflection thereof in said plane mirror, and two lenses one of positive power and the other of negative power, said lenses being supported on said lens supporting means with their optical axes intersecting each other in said rotational axis, the optical axes of said lenses further intersecting each other at an angle bisected by said rotational axis and equal to the inclination of the optical axis of said eyepiece between said eyepiece and plane mirror to the optical axis of said eyepiece as reflected in said plane and concave mirrors.

2. A magnifier comprising an eyepiece, a semi-transparent plane mirror disposed on the object side of the eyepiece in position to be obliquely intersected by the optical axis of the eyepiece in its object space, a concave mirror disposed on the side of said plane mirror opposite the eyepiece, in position to be intersected by said axis as extended undeviated through said plane mirror, said concave mirror having its concave side facing said plane mirror, means defining an object plane transverse to said axis as reflected in said plane and concave mirrors, said object plane being optically distant from said concave mirror by a distance whose conjugate in said concave mirror is substantially equal to the optical distance between said concave mirror and the first focal plane of said eyepiece, the optical distance between said concave mirror and said first focal plane being substantially equal to the radius of curvature of said concave mirror, lens supporting means journaled for rotation in an axis fixed with respect to said eyepiece and concave mirror, said axis of rotation lying in the plane of said plane mirror and in the plane defined by said optical axis before and after reflection thereof in said plane mirror, and two lenses one of positive power and the other of negative power, said lenses being supported on said lens supporting means with their optical axes intersecting each other in said rotational axis, the optical axes of said lenses further intersecting each other at an angle bisected by said rotational axis and equal to the inclination of the optical axis of said eyepiece between said eyepiece and plane mirror to the optical axis of said eyepiece as reflected in said plane and concave mirrors.

3. A magnifier comprising a frame, means in the frame defining an object plane, means supported from the frame defining a partially reflecting plane surface obliquely inclined to the object plane, a first Mangin mirror supported in the frame with its axis substantially perpendicular to the object plane and at an optical distance from the object plane substantially equal to its effective radius of curvature, said surface passing between the object plane and the first Mangin mirror, a second Mangin mirror substantially identical to the first supported in the frame at the position of the mirror image of the first Mangin mirror in said surface, an eyepiece including a field lens and an eye lens, said field lens being supported in the frame substantially coaxially of said second Mangin mirror, said eyepiece lenses being supported in position to space the first focal plane of said eyepiece at an optical distance from the surface of said second Mangin mirror substantially equal to the effective radius of curvature thereof, a roof prism positioned in the frame between said field and eye lenses, a turret journaled in said frame with its axis of rotation lying in said surface and lying in the plane defined by the axes of said mirrors, a positive lens and a negative lens mounted on said turret with their axes intersecting at right angles to each other on the axis of rotation of said turret, said turret being so formed as to simultaneously position said positive lens coaxially with said first mirror between said surface and object plane and said negative lens coaxially of said second mirror between said surface and said field lens, said turret being rotatable through 180° to interchange the positions of said positive and negative lenses.

References Cited in the file of this patent

UNITED STATES PATENTS

| 2,151,631 | Williams | Mar. 21, 1939 |
| 2,156,911 | Brown | May 2, 1939 |
| 2,352,644 | Linderman | July 4, 1944 |
| 2,442,396 | Bubb | June 1, 1948 |
| 2,482,115 | Laird | Sept. 20, 1949 |
| 2,490,747 | Creighton | Dec. 6, 1949 |
| 2,593,724 | Bouwers | Apr. 22, 1952 |
| 2,601,175 | Smith | June 17, 1952 |
| 2,661,658 | Dyson | Dec. 8, 1953 |